May 20, 1930.　　　J. D. WINANS　　　1,759,028
ROTARY INTERNAL COMBUSTION ENGINE
Filed Dec. 28, 1926　　4 Sheets-Sheet 2

Inventor
Joseph D. Winans
By Thomas Bilyeu
Attorney

May 20, 1930.  J. D. WINANS  1,759,028
ROTARY INTERNAL COMBUSTION ENGINE
Filed Dec. 28, 1926  4 Sheets-Sheet 4
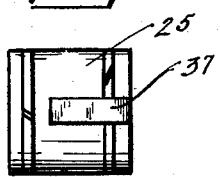
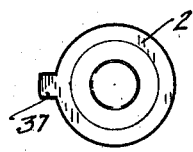
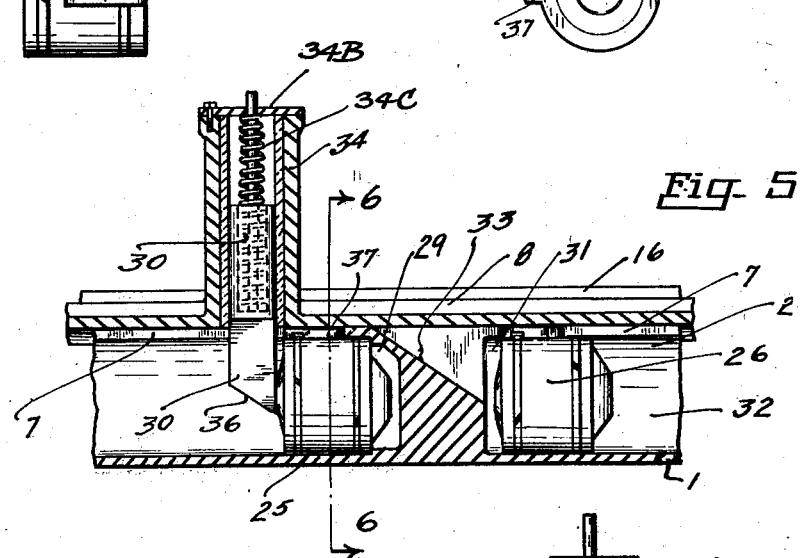
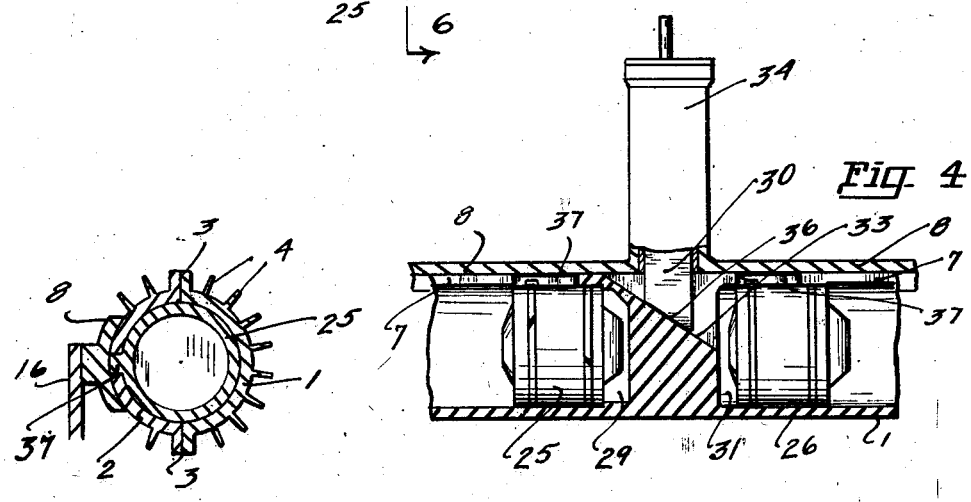
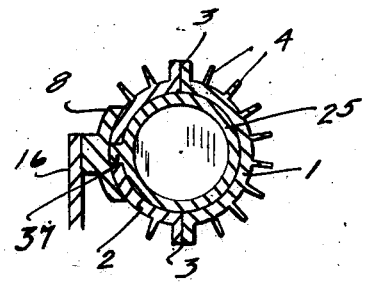
Inventor
Joseph D. Winans
By Thomas Belyea
Attorney Patented May 20, 1930

1,759,028

UNITED STATES PATENT OFFICE

JOSEPH D. WINANS, OF WEST TIMBER, OREGON

ROTARY INTERNAL-COMBUSTION ENGINE

Application filed December 28, 1926. Serial No. 157,498.

This invention relates to internal combustion engines of the rotary type, and has for its primary object the adaptation of the rotary type of internal combustion engine for use as a prime mover in the direct driving of a power shaft, and thereby eliminating the connecting rods, crank rods, and other incidentals required in reciprocating engines.

My invention consists primarily of a split housing having a series of annular cylinders disposed within the housing, and having pistons adapted to reciprocation within the cylinders. Means being provided for the intaking of the fuel within the cylinder and the compressing of the charge taken in, and exhausting the products of combustion, and means being provided for the igniting of the power-giving medium at predetermined points in the rotation of the cylinder.

Additional objects of my invention consist in the construction of a prime mover of few parts, one that will not easily get out of order, and one that may be operated by inexperienced operators once the same has been assembled for use.

A further object of my invention consists in providing means for the air cooling of the combustion cylinder and the incidental parts associated therewith.

A still further object of my invention consists in providing a cylinder, slots disposed within the cylinder wall, said slots being covered by an annular ring relatively stationary as related to the cylinder, which said cylinder is adapted to being rotated relative to the ring adjacent thereto, means being provided for maintaining the pistons during the power impulse relatively stationary with that of the cylinder, and at other parts of the stroke to being oscillated within the cylinder.

With these and incidental objects in view, the invention consists in certain novel features of construction and combination, the essential elements of which are set forth in the appended claims, and a preferred form of embodiment of the device as hereinafter shown with reference to the drawings which accompany, and form a part of this specification.

In the drawings:—

Figure 1:
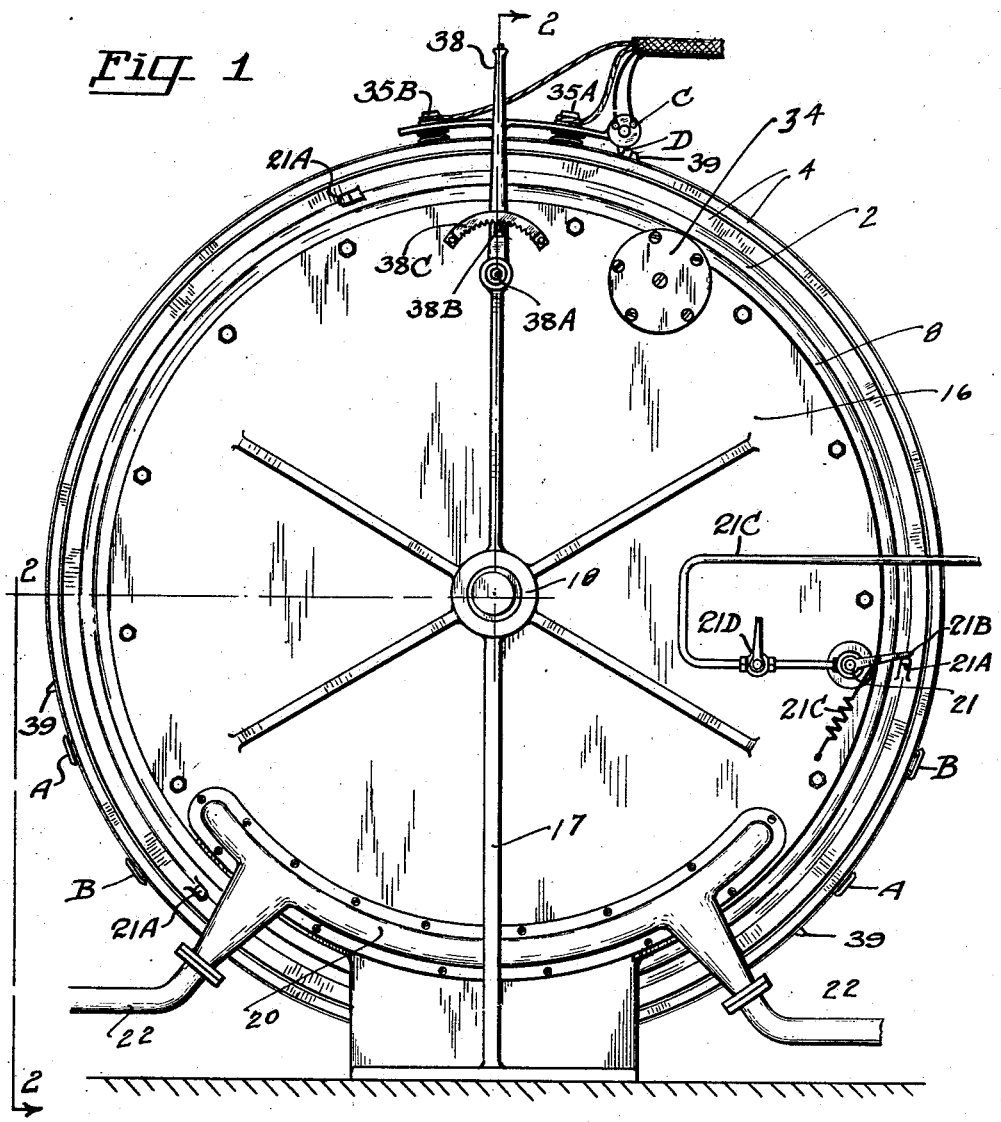
Fig. 1 is a side elevation of the inlet and exhaust side of the cylinder.
Figure 2:
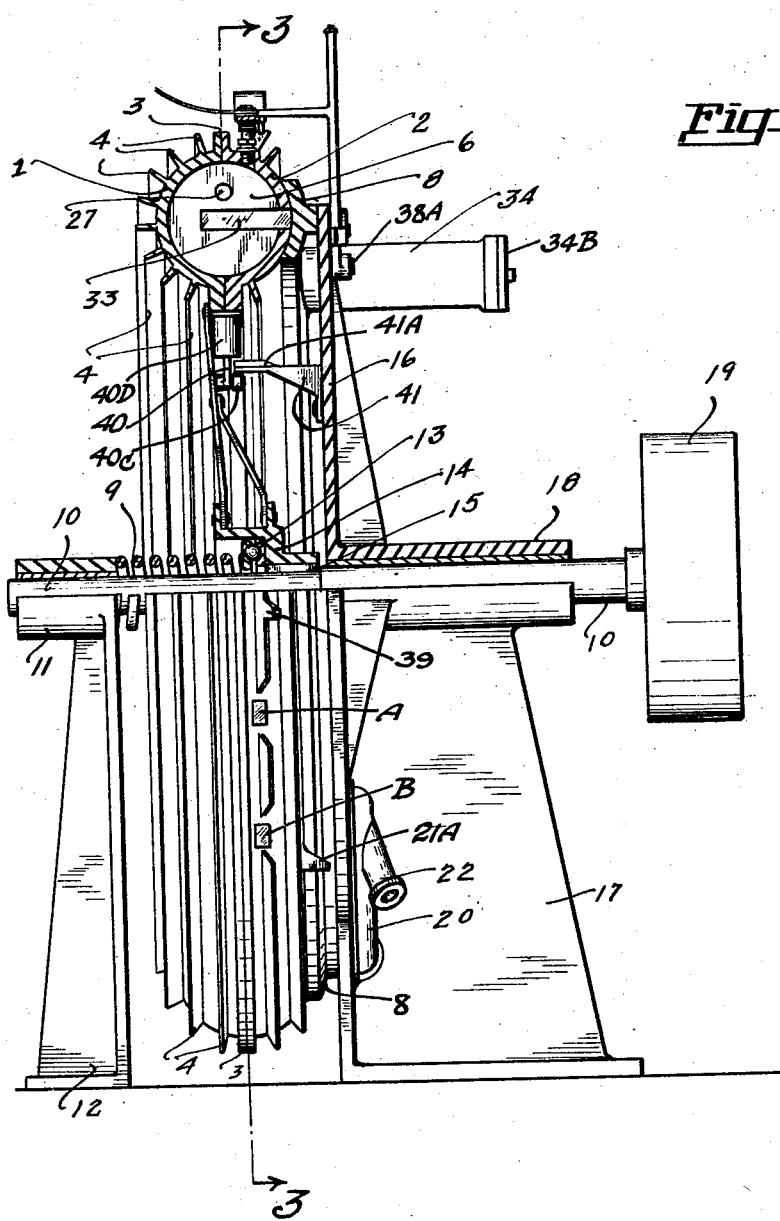
Fig. 2 is an edge view taken on line 2—2 of Fig. 1, looking in the direction indicated, the same being a partial cross-section view.

Fig. 4 is a cross section view of the cylinder wall, illustrating the diagram disposed across the cylinder, and illustrating the pistons and chamber being at either side of the diaphragm. Fig. 4 being a cross section view taken on line 4—4 of Fig. 3, looking in the direction indicated. In this view the locking device for maintaining the piston stationary relative to the cylinder is shown being raised into position for engagement behind the piston, after the same has travelled sufficiently to permit the same engaging therebehind.

Fig. 5 is a cross section view of the mechanism illustrated in Fig. 4, with the locking member engaged and maintaining the piston relatively stationary to the locking member.

Fig. 6 is a cross section view taken on line 6—6 of Fig. 5, looking in the direction indicated.

Fig. 7 is a top plan view of one of the pistons.

Fig. 8 is an end view of the mechanism illustrated in Fig. 7.

Like reference characters refer to like parts throughout the several views.

In my new and improved device I make the cylinder of two associated casing members 1 and 2, joined together at their media lines and secured by any suitable fastening means to the ribs 3. Radiating fins 4 are provided on the exterior of the cylinder to facilitate the cooling of the same. Adjacent cylinders 5 are disposed within the two casing members, in which the explosions occur and in which reciprocable pistons are disposed.

The prime mover here shown has three cylinder compartments formed therein by the diaphragm 6, 6A and 6B. A slot 7 is disposed through the cylinder wall of each of the compartments, and to prevent the escapement of the compression developed within the cylinder on the explosion of the charge of the working medium a ring 8 is in intimate contact with the surface of one of the cylinder casing members. A working pressure is maintained between the ring 8 and the casing member by the compression spring 9 disposed upon the shaft 10. The spring upon its one end is in registering engagement with the hub 11 of the bracket support 12 of the prime mover. The opposite end of the spring engages with a suitable bearing 13, as a ball bearing, which engages with the hub 14 of the rotating cylinder. The hub 14 is secured directly to the shaft 10 by a suitable key 15. The ring 8 is maintained in a stationary condition by being secured to the bracket 16, mounted upon the pillow block 17. A hub 18 is disposed about the shaft 10 to afford an adequate bearing for the shaft. A pulley 19 is secured to the outer end of the shaft, from which pulley the power is taken from the prime mover. An exhaust manifold 20 is disposed adjacent the cylinders with an exhaust pipe 22 leading therefrom. The exhaust manifold communicates through the ring 8 and through the slot 7 with the cylinders as they respectively pass thereby. An inlet port 24 is provided for the passage of gas fuel into the compression chamber, or that portion of each cylinder wherein the gas fuel is compressed prior to combustion. The means for compressing the gas fuel will be described later.

The inlet port 24 is formed through the annular ring 8. Exterior to the bracket or web 16 and communicating with the port 24 is a valve 21. The valve 21 is provided with a lever or arm 21B for opening the same. The valve is normally closed by reason of a spring 21C, and it may be of any well known type suitable for that purpose. Upon the surface of each of the cylinders is formed a lug or finger 21A. When the valve 21 is closed, the lever resides in the path of the movement of the finger 21A, and as each lug passes the valve it moves the lever 21B, thereby opening the valve. After the lug releases the lever 21B the valve is closed by the spring 21C. At the moment the valve is opened, at a time when the compression chamber of one of the cylinders is opposite thereto, and the gas fuel is discharged through the port 24 into the chamber. A fuel line 21C supplies fuel to the valve 21 from a supply not shown. The fuel supply line 21C is provided with a cut-off valve 21D whereby the fuel supply going to the valve may be cut off.

The diaphragms 6, 6A and 6B, divide the main cylinder or annular member into three power cylinders, each of which is provided with a piston, which are shown here as 25, 26 and 26A. Each piston divides its associate cylinder into a compression and a combustion chamber, said chambers being at opposite ends of their respective cylinders. Forward of the piston 25 is the combustion chamber 29, and rearward thereof, compression chamber 29A. Forward of pistons 26 and 26A respectively are combustion chambers 32, and 34A; and rearward respectively compression chambers 31 and 34.

As before stated three diaphragms or piston heads 6, 6A and 6B, divide the main cylinder into three power cylinders, which separate the explosion chamber of each cylinder from the compression chamber of the forward adjacent cylinder.

Extending through each of the diaphragms 6, 6A and 6B, and allowing communication from each compression chamber to the explosion chamber rearward thereof, is a passageway or port 27, which admits the passage of the compressed fuel from the compression chamber of one cylinder, to the explosion chamber rearward thereof. The respective passageways 27, at the explosion chamber end thereof, are each provided with a check valve 28 which prevents the passage of the compressed fuel from the explosion chamber to the compression chamber, but not vice versa.

Figure 3:
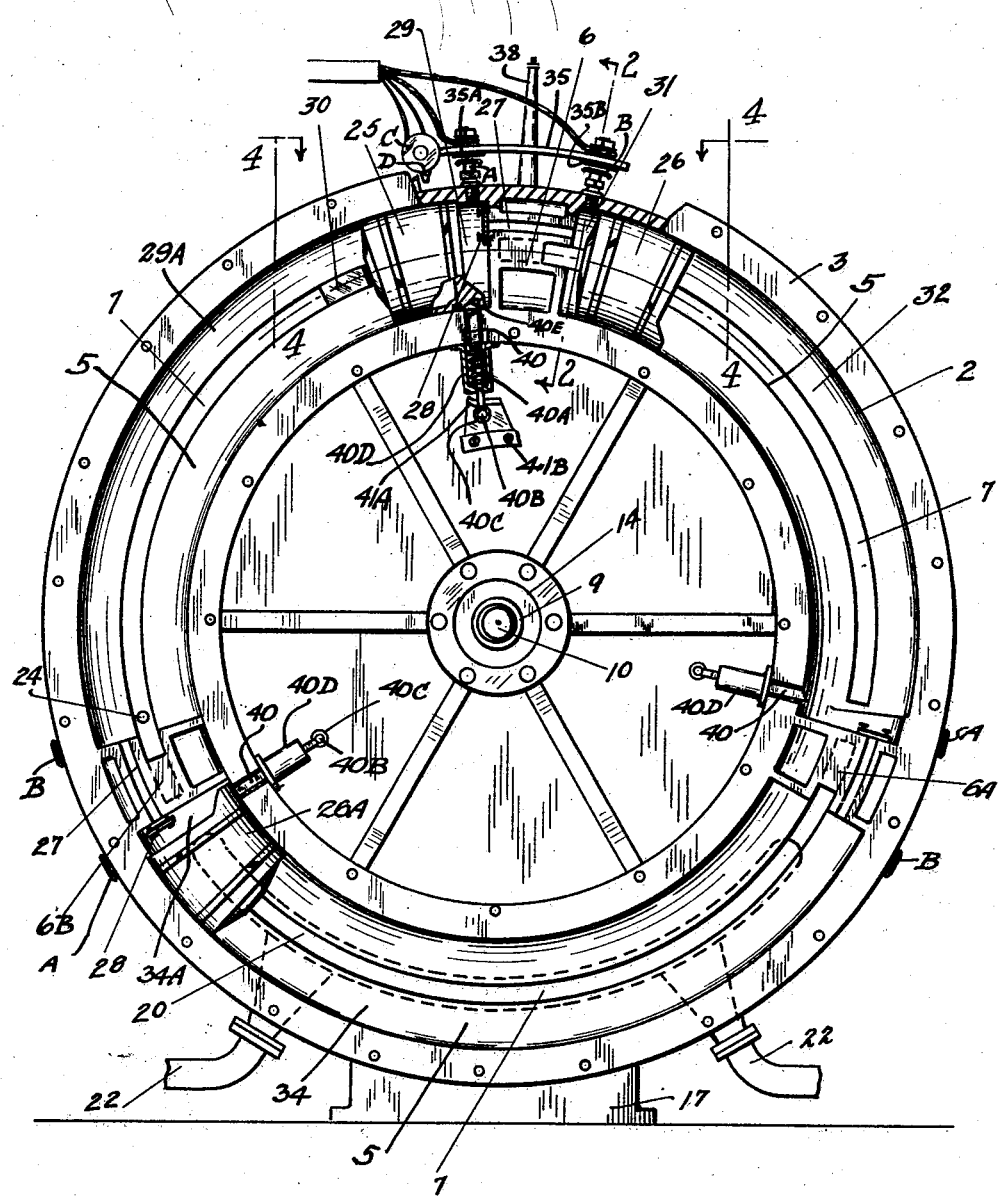
Fig. 3 is a cross section view taken on line 3—3 of Fig. 2, looking in the direction indicated.

When the respective pistons have compressed the gas fuel within the respective compression chambers they each assume the position with regard to its rearward diaphragm, as that shown by the piston 26 and the rearward diaphragm in Fig. 3.

Through the cylinder walls and adjacent the ends of each of the diaphragms 6, 6A and 6B are spark plugs A and B which fire respectively in the explosion chamber and the compression chambers. The spark plugs A and B as the cylinders revolve upon the shaft 10, at the uppermost point of their revolution are in position opposite electric contacts 35A and 35B respectively. The contacts 35A and 35B connect with an ignition system not shown, are supported by the plate 35, itself carried by the spark control or lever 38. The lever 38 is rockably mounted to the web 16 by means of the pin 38A, which allows the spark to be advanced or retarded as required. The position of the member 38 is retained by means of a spring operated detent, 38B, thereon, which may be of any preferred construction, engaging the detent quadrant 38C mounted to the web 16.

The spark plugs A and B are each grounded on one side of the circuit to the frame of the motor. When the cylinders have revolved to the position uppermost, as shown in Fig. 3, to close the circuit to the plugs, a finger 39 formed upon the cylinders, as the cylinders revolve, contacts with the trigger D of the switch C, thereby closing the ignition circuit.

In Fig. 3, let it be assumed that the cylinders are revolving clockwise with the shaft 10, and also assuming for the purpose of properly illustrating the invention, that the piston 26 has compressed gas fuel within the explosion chamber 29, and that there is a residue of the compressed gas in the compression chamber 31, and that the finger 39 engages the trigger D of the switch C, thus closing the ignition circuit and igniting the gas in both chambers 29 and 31.

The explosion of the compressed gas within the chamber 31 forces the piston 26 to move forward toward the diaphragm 6A. The piston 26, as it moves forward, forces the burned gases out of the firing chamber 32 through the manifold 20, the cylinder having revolved to the position assumed by the compression chamber 34 in Fig. 3, opposite the exhaust manifold 20. After the burned gases have been exhausted from the compression chamber 31, (which at this time by reason of the forward movement of the piston 26, is in area equal to the chambers 29A and 34), the cylinders still revolving, the compression chamber 31 moves to the position which the chamber 29A assumes in Fig. 3, where it receives a charge of gas to be compressed. The operation just described applies to all the pistons and cylinders in turn as they revolve with the shaft 10.

The piston 26 as it moves to the forward end of its cylinder, assumes the relatively same position therein as does the piston 26A in its cylinder, and is temporarily retained in that position by a latch 40, which is urged into the slot 40E by the spring 40A. The latch 40 is mounted, in a supporting element or casing 40D. Hereafter in describing the reason for holding the piston in the forward end of its cylinder, compressing the fuel, and the means for utilizing the explosion in the explosion chambers for exerting power for driving the engine, reference will be had to the pistons 25 and 26A and their associated cylinders.

The means for igniting the explosion charges or compressed gases in the cylinders has been heretofore described and will not again be described for what follows. In combustion engines of the reciprocating type, at the time the gases are ignited in the combustion or explosion chamber, the expansion of the gases moves the piston from the cylinder heads, of which the diaphragms 6, 6A and 6B are equivalent. But in this device the operation is reversed, in that the piston is temporarily held stationary and the cylinder heads, the diaphragms, are moved or forced from the pistons. In Fig. 3, the element 30 is a locking bar or plunger. Figs. 4 and 5 illustrate in detail the construction of this locking element, wherein 30 is the locking bar provided with a diagonal or inclined end 36, a casing or guideway 34 in which it is reciprocably disposed, a spring 34C extending between the cap 34B and the bar 30 and constantly urging the bar through the slot 7 in the cylinder wall. The bar 30 and its supporting elements are held stationary relative to the revolving cylinders.

At the time of the explosion in the chamber 39, the bar 30 is projecting inwardly at the rear of the piston 25 and prevents it from receding from the diaphragm 6, but the cylinders being free to revolve with the shaft 10, the diaphragm 6 is forced to recede from the piston 25. At the time of the explosion the diaphragm 6B moves toward the piston 25 at which time the gas in the chamber 29A is compressed and a portion thereof forced through the port 27 into the explosion chamber 34A where it is held and prevented from returning and expanding in the chamber 29 by reason of the check valve 28 heretofore referred to.

Figs. 4 and 5 show that the bar 30 projects within the cylinder walls, and as the respective diaphragms and pistons are constantly moving toward the bar 30, means are provided whereby the bar 30 will ride over the diaphragms and pistons. Each of the diaphragms is provided with an inclined recessed portion 33, each engaging the bar 30 as the cylinders revolve, and up which the bar rides, the inclination of the recess causing the bar 30 to recede thereby allowing the diaphragm and the piston immediately to the rear thereof to pass thereby. Each piston is provided with a lug 37 upon each piston, which rides in the slot 7, and over which the bar 30 rides until it is in position to project to the rear of the piston as previously described.

A fraction of time before the ignition of the explosive charge in the explosive chamber, and at the time the bar 30 passes behind piston 25, the latch 40 is withdrawn from the slot 40E by means of the roller 40C, carried by the pin 40B through the latch 40 riding upon the inclined stationary member or cam 41A. The cam 41A is a projecting portion of the bracket 41 which is secured to the web 16 by means of bolts 41B. The release of the latch 40 permits the piston to remain stationary momentarily during the explosion and compression period heretofore described.

In the description of the operation and construction of the apparatus, reference was had to particular elements of which there exist a multiple, such as pistons, cylinders, latches, it is to be understood that a particular description of the operation of either of these elements individually, applies with the same particularity to each of the others.

While the form of mechanism herein shown and described is admirably adapted to accomplish the objects primarily stated, it is not intended to confine the invention to the specific form herein described, as it is susceptible of embodiment in various ways all coming within the scope of the claims which follow.

What I claim is:—

1. In a rotary internal combustion engine, the combination of a rotary casing provided with a plurality of arcuate cylinders separated by diaphragms constituting clyinder heads, a piston to travel in each cylinder, means to exhaust and feed charges to said cylinder successively, means cooperating with the feed means for supplying a fuel charge in each cylinder forward and rearward of its piston, means for firing the fuel charge in the two chambers, simultaneously, means for holding said pistons stationary during the firing of the forward fuel charge, thereby causing the diaphragm ahead of each piston to recede and impart rotation to said casing, means for releasing the holding means when the diaphragm to the rear of each successive piston has moved adjacent thereto, means for firing the charge to the rear of each successive piston subsequent to firing the charge ahead thereof whereby each piston is caused to move to the forward end of its cylinder, means for holding each piston in the forward end of its cylinder, and means for releasing the last mentioned holding means operating coincident with the firing of the forward fuel charge.

2. In a rotary internal combustion engine, the combination of a rotary casing provided with a plurality of arcuate cylinders separated by diaphragms constituting cylinder heads, a piston reciprocable in each cylinder, stationary exhaust and fuel inlet passageways successively communicated with by each cylinder in rotation, a passageway affording communication from each cylinder to that immediately to the rear thereof only, whereby fuel is fed from the rear end of each cylinder to the forward end of the successive cylinder, means for firing the fuel in said cylinders in pairs simultaneously, whereby the piston in each successive first cylinder moves to the forward end thereof, a latch holding each said last mentioned piston in said forward position, means operating coincident with the firing of the fuel for releasing the latch on the successive second piston, other means coincidental with the firing of the fuel charge holding the successive second piston from receding from the diaphragm forward thereof, but allowing advancement of said diaphragm, thereby imparting rotation to said casing, and the diaphragm to the rear thereof moving forward and releasing the holding means from the successive second piston at the same time compressing and passing a portion of the fuel in the rear of the second chamber to the front end of the successive third chamber.

JOSEPH D. WINANS.